3,290,368
N-SORBOYLAMINO ACIDS
Hans Fernholz, Bad Soden, Taunus, and Hans-Joachim Schmidt and Erich Lück, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 27, 1963, Ser. No. 283,538
Claims priority, application Germany, May 30, 1962, F 36,937
6 Claims. (Cl. 260—534)

The present invention relates to the preservation of highly perishable materials.

It is known that the importance of sorbic acid for the preservation of foodstuffs is due to the fact that sorbic acid, on the one hand, has a strongly noxious effect on certain microorganisms but that, on the other hand, it is entirely harmless for the human and higher animal organism. It acts as a usual alimentary fatty acid and is treated in metabolism like any other fatty acid. Sorbic acid exerts a noxious effect substantially on yeasts and molds, that is to say it exerts an antifungal or antimycotic effect, i.e., inhibiting the growth of fungi (fungistatic effect) and destroying fungi (fungicidal effect). Occasionally it has also been observed that sorbic acid exerts a noxious effect on bacteria (bactericidal effect) which, however, is practically of no importance. It is known, moreover, that sorbic acid can be used as a preservative that has a selectively antifungal effect in fermentation processes caused by bacteria. In the processing of sauerkraut or pickled cucumbers, for example, it inhibits the undesirable growth of yeasts while it has no influence on the desirable lactic fermentation caused by bacteria. On the one hand, certain advantages may be derived from this selective action of sorbic acid on mold and yeast fungi, but on the other hand it limits the applicability of sorbic acid.

It is true that for the preservation of food there are primarily needed substances having a fungistatic action because most foodstuffs perish mainly on account of the action of molds and yeasts. However, there exists a demand for substances having substantially bactericidal properties, especially for the preservation of foodstuffs containing animal protein, for example meat and fish. Even in the case of foods of vegetable origin, for example fruit juices or wines, it may be necessary to destroy, in addition to the mold and yeast fungi, for example also the acetic acid or lactic acid bacteria.

As preservatives against the decay caused by bacteria there have been proposed in recent years, inter alia, antibiotics which, however, could not be used for preserving foodstuffs for medicinal reasons. In the preservation of fish, hexamethylene tetramine is used as a perservative. This substance has likewise been objected to more and more in recent years because it splits off formaldehyde, a substance which is harmful from a physiological point of view.

It is known that several amides or hydrazides of aliphatic monocarboxylic acids exhibit an antienzymatic or antimicrobial action, for example sorbic acid anilide and N-acylamino derivatives of saturated lower aliphatic amino carboxylic acids in which the acyl radical is derived from saturated fatty acids having 12 to 16 carbon atoms. Also the antimicrobial action of sorbic acid phenyl hydrazide and sorbic acid-N-ethyl-ortho-toluidide has already been described. However, these substances are noxious from a physiological point of view and cannot be recommended for the preservation of foodstuffs because the acid amide bond thereof readily splits up in the human body with the formation of free carboxylic acid and the respective nitrogen-containing compound. Even those of the aforementioned substances whose cleavage products do not have a noxious effect on the human body, for example lower aliphatic amino carboxylic acids which are N-acylated with higher fatty acids, for example those having 12 to 14 carbon atoms, are, as is known, in general not suitable for the preservation of foodstuffs and have the property of inhibiting the activity of microorganisms and ferments in the mouth where they inhibit, for example, the decomposition of cleavable carbohydrates, especially sugar, for which reason they are used as cosmetics for the mouth to prevent tooth decay.

For the above-mentioned reasons it seemed to be of great importance to prepare sorbic acid compounds having mainly an antibacterial action and possessing the physiological and pharmacological properties peculiar to sorbic acid, which are especially advantageous for the preservation of foodstuffs. Compounds of this type have not yet been described.

Now we have found that highly perishable materials, especially foodstuffs, can be preserved also against the action of bacteria by adding to the highly perishable material one or several N-sorboylamino compounds of the formula

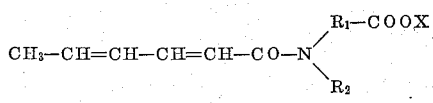

in which $R_1$ represents the radical of an amino carboxylic acid minus an amino group and minus a carboxylic acid group, $R_2$ represents hydrogen or a short-chained alkyl group having about 1 to 4 carbon atoms, especially 1 to 2 carbon atoms, and X represents hydrogen or a metal. By the sorboyl radical there is understood the 2,4-hexadienoyl radical $CH_3$—$CH$=$CH$—$CH$=$CH$—$CO$—.

As amino-carboxylic acids, on which the N-sorboylamino-carboxylic acids used according to the invention are based, there are especially suitable those which occur in the native human protein, primarily glutamic acid and, furthermore, especially α-amino carboxylic acids, such as α- and β-alanine, α-amino-butyric acid, asparagin, aspartic acid, cystine, dihydroxyphenyl-alanine, glutamine, glycine, isoleucine, leucine, lysine, methionine, norleucine, ornithine, hydroxyglutamic acid, hydroxyproline, proline, serine, tryptophan, tyrosine and valine. Sarcosine, for example, is a suitable N-alkyl-N-acylamino acid.

Exemplary of suitable N-sorboylamino-carboxylic acids are, inter alia: N-sorboyl-glutamic acid, N-sorboyl-leucine, N-sorboyl-valine, N-sorboyl-isoleucine, N-sorboyl-glycine, N-sorboyl-asparagine and N-sorboyl-sarcosine as well as the preferably water-soluble salts thereof, especialy the salts of alkali metals or alkaline earth metals and mixtures of these substances.

When X represents a multivalent metal in the above-mentioned formula, the free valencies of this metal are bound by further N-sorboylamino-carboxylic acid radicals or hydroxyl groups. Exemplary of salts of alkaline earth metals are the neutral and the basic calcium glycinates. In the case of the neutral salt, the calcium is bound to two N-sorboyl-glycine radicals, in the case of the basic salt the calcium is bound to one N-sorboyl-glycine radical and one hydroxyl group.

Of the alkali metal salts there are found to be very suitable, inter alia, the mono-potassium salt of N-sorboyl-glutamic acid which is entirely neutral in taste.

The N-sorboylamino-carboxylic acids or the mixtures thereof are added to the material to be preserved generally in amounts ranging from 0.005 to 3 percent, preferably 0.05 to 0.3 percent, calculated on the weight of the total mixture.

The substances applied according to the present invention are, in general, readily soluble in water. Their application is very simple since they may be added to the material to be preserved in the form of an aqueous solution.

The substances may also be mixed in solid form with the material to be preserved or may be stirred into the latter. The water solubility of the salts, especially of the alkali metal salts, is frequently even better than that of the free carboxylic acids.

In respect of taste, the substances are neutral, i.e. in the concentrations used they neither impair the aroma nor the taste of the foods that have been preserved therewith.

Highly perishable materials which can be preserved according to the invention by the addition of N-sorboyl-amino-carboxylic acids, are especially those food stuffs which are liable to decay by bacteria, for example meat, fish or other foodstuffs containing animal or vegetable protein, fruit juices, wine gelatin, and the like. Commercial products that are liable to decay by bacteria, for example glue based on protein and similar products, can also be preserved by the additives according to the invention.

The N-sorboylamino-carboxylic acids can, of course, also be applied in mixture with other substances that are already being used in the field of preservation. They may contain, for example, lower or higher amounts of free sorbic acid, benzoic acid, formic acid, para-hydroxybenzoate or compounds having a similar action.

The N-sorboylamino-carboxylic acids and the salts thereof used according to the invention are new compounds. They may advantageously be prepared by acylation processes which are in themselves known, by converting the amino carboxylic acid, preferably in the form of one of its salts, for example the sodium salt or triethylamine salt, or in the form of an ester whose alcohol component is preferably derived from an alkanol having 1 to 4 carbon atoms, with sorbic acid chloride or a sorbic acid compound having a similar acylating action, such as sorbic acid bromide, sorbic anhydride or a mixed anhydride of sorbic acid with another carboxylic acid.

It was found to be especially advantageous to use an anhydride of sorbic acid with a monoester of carbonic acid whose alkyl radical preferably contains 1 to 4 carbon atoms. When the process is carried out with the aid of such an anhydride, the solution obtained by the conversion of equimolar amounts of a salt of sorbic acid and an alkyl ester of chlorocarbonic acid in an inert anhydrous solvent can be used without special isolation or purification of the anhydride. This solution is then brought together with the solution of a salt of the amino carboxylic acid, with agitation, and the N-sorboylamino-carboxylic acid formed is isolated in an appropriate manner, for example by acidifying with a strong acid, and purified in known manner, for example by recrystallization. Exemplary of inert solvents are especially aromatic hydrocarbons such as benzene, toluene, xylene or ethyl benzene or also ethers, such as diisopropyl ether, dioxane or tetrahydrofurane in which the sorbic acid salt and the anhydride are readily soluble. The salt of the amino carboxylic acid is most advantageously used in the form of an aqueous sodium salt solution. Temperatures within the range of from —10° to +10° C., preferably —5° to +5° C., are suitable for the preparation of the anhydride solution and for the acylation reaction.

Another advantageous possibility of preparing N-sorboylamino-carboxylic acids consists in reacting the esters of the amino carboxylic acids according to the Schotten-Baumann method, for example in the presence of a dilute solution of an alkali, such as an aqueous solution of sodium hydrogen carbonate, sodium carbonate or sodium hydroxide, at temperatures ranging from —10° to +10° C., preferably —5° to +5° C., while stirring or shaking with sorbic acid chloride. The N-sorboylamino acid ester obtained thereby is converted by hydrolysis, for example with alcoholic sodium hydroxide solution or caustic potash solution, and subsequent acidification with a strong acid into the free amino carboxylic acid.

It is possible, for example, to prepare N-sorboyl-glycine by adding a solution of 108.5 g. (1 mol) chlorethyl formate in 100 ml. of diisopropylether dropwise to a solution of 112 g. (1 mol) sorbic acid and 102 g. (1 mol) triethyl amine in 500 ml. dry diisopropylether, with agitation, at a temperature ranging from —5° to 0° C., in the course of 30 to 60 minutes. The mixture is stirred for another hour at the aforementioned temperature. Then an ice-cooled solution of 1 mol glycine in 1 equivalent of 2 N sodium hydroxide solution is added to the mixture while stirring vigorously or using a vibrator. The reaction mixture is stirred for another hour at the tempeatue indicated and for another 4 hours without cooling, while the mixture slowly warms up to room temperature. The aqueous layer is separated, acidified with 2 N sulfuric acid until a pH of 5.7 to 5.8 is attained and cooled in ice water. The precipitated, unconverted sorbic acid is filtered off with suction. Upon further acidification of the filtrate to a pH of 3.5, the N-sorboyl-glycine precipitates in the form of crystals which are filtered off with suction, dried and freed from traces of sorbic acid by extraction with cyclohexane in the heat. The reaction product is recrystallized from water at a temperature of 80° C. Colorless crystalline needles are obtained which have a melting point of 167° C. Yield: 114 g. of N-sorboyl-glycine.

Another possibility of preparing N-sorboyl-glycine is, for example, as follows: 26 g. of sorbic acid chloride and 0.1 mol of a saturated soda solution are added dropwise to a solution of 28 g. (0.2 mol) of glycine ethyl ester hydrochloride in 80 g. of a 10% sodium hydroxide solution at 0° C., with agitation, in a manner such that the pH of the reaction mixture always remains feebly alkaline. When the addition is terminated, agitation is continued for a short time at 0° C. and the mixture is warmed up to room temperature. The precipitated N-sorboyl-glycine-ethyl-ester is filtered off with suction and recrystallized from diisopropylether after drying. Yield: 26 g.; melting point: 90° C. Another 7 g. of the reaction product can be obtained from the filtrate by extraction with ethyl acetate. Total yield: 34 g. By hydrolyzing N-sorboyl-glycine-ethylester with 1 equivalent of 1 N alcoholic sodium hydroxide solution under nitrogen, while acidifying the hydrolyzed mixture, N-sorboyl-glycine is obtained in a yield of 90 to 95% of the theory, calculated on the N-sorboyl-sarcosine can be prepared according to the first of the two above-mentioned methods for the preparation of N-sorboyl-glycine with the use of a commercial 15.7% aqueous solution of the sodium salt of sarcosine. After the separation of the free sorbic acid at a pH of 5.7, N-sorboyl-sarcosine, upon further acidification, first precipitates in the form of an oil which is taken up in ethyl acetate. The ethyl acetate extract is washed with a little water and concentrated in vacuo. On cooling, the N-sorboyl-sarcosine crystallizes and is recrystallized from a mixture of water and methanol (90% water). Melting point 124° to 125° C., yield 74% (calculated on the converted sorbic acid).

N-sorboyl-glutamic acid can be prepared in a similar manner by introducing the reaction mixture which is composed of 1 mol each of sorbic acid, triethylamine and ethyl chloroformate in toluene in the cold into a solution of 1 mol of glutamic acid in 2 equivalents of a 2 N sodium hydroxide solution and stirring the mixture for another 5 hours while it slowly warms up to room temperature. After separation of the aqueous layer, the reaction product is worked up in a manner similar to that as described above in the case of N-sorboyl-sarcosine, by partial precipitation and extraction of the oily reaction product with ethyl acetate. After distilling the ethyl acetate in vacuo, the N-sorboyl-glutamic acid is recrystallized from water or another suitable solvent. Melting point: 154.5° C.; yield: 70.5% (calculated on the converted sorbic acid).

For the preparation of the acid potassium salt of the N-sorboyl-glutamic acid, a solution of 60 g. of potassium hydroxide of 85% strength in 80 ml. water is added dropwise to a solution of 1 mol of N-sorboyl-glutamic acid in 800 ml. of methanol, with agitation and external cooling. After a short time, the formation of crystals begins which is completed by storing the mixture at 0° C. for several hours. The crystals are filtered off with suction, washed with a little methanol and dried at room temperature in vacuo. Yield: 85% of the theory; melting point 208° C. to 210° C. with decomposition.

N-sorboyl-valine can be prepared according to the first of the two methods indicated for the preparation of N-sorboyl-glycine with the use of toluene as a solvent. By acidification with 2 N sulfuric acid N-sorboyl-valine and free sorbic acid are jointly precipitated from the aqueous layer containing the reaction product. The precipitate is filtered off with suction and is recrystallized from ethyl alcohol of 70% strength, while sorbic acid remains in solution. Yield: 165 g., melting point 188° to 189° C.

For the preparation of N-sorboyl-isoleucine, 131 g. of d,l-isoleucine, dissolved in 1 equivalent of 2 N sodium hydroxide solution, are added dropwise, for example, to a solution of sorbic acid and monoethyl carbonate anhydride in toluene prepared from 1 mol each of sorbic acid, triethyl amine and ethyl chlorocarbonate in such a manner that the temperature does not exceed +5° C. The mixture is stirred for another 3 hours at 15° to 20° C. The aqueous layer is then separated and further processed, as was the case with N-sorboyl-sarcosine, by partial precipitation and extraction of the precipitate with ethyl acetate. When recrystallized from ethanol, the N-sorboyl-isoleucine melts at 168° to 170° C. Yield: 154 g.

The preparation of N-sorboyl-asparagin is preferably carried out according to the first method indicated for the preparation of N-sorboyl-glycine with the use of toluene as a solvent. After the addition of asparagin (1 mol), the reaction mixture has an alkaline reaction. The mixture is carefully acidified with semi-concentrated hydrochloric acid until a pH of 5 is attained while unconverted asparagin precipitate (12 g.) After the filtration, the pH of the solution attains a value of 3.5 by further addition of hydrochloric acid while N-sorboyl-asparagin precipitates in the form of colorless crystals. The crystals are filtered off with suction, dried and extracted with hot cyclohexane in order to remove unconverted sorbic acid. Yield: 172 g.; melting point: 192° C.

While sorbic acid, as stated above, generally only exhibits a slight action on bacteria, the N-sorboyl compounds used according to the invention exhibit a pronounced antibacterial action. Although an effect on mold and yeast fungi is also exerted, it is inferior to the antibacterial effect. The result that a compound constructed of sorbic acid which primarily has an antifungal effect and of an aminocarboxylic acid which does not have an antimicrobial effect, exerts a pronounced antibacterial effect is very surprising. Tests showed that an N-sorboylamino-carboxylic acid such as, for example, N-sorboyl-glutamic acid, does not yet exhibit an action on *Penicillium glaucum* and *Candida ablicans* in a concentration of 10 mg./ml., while the minimum concentration at which sorbic acid inhibits the growth of these microorganisms is 0.05 mg./ml. On the other hand, sorbic acid practically exhibited no action on *Corynebacterium diphteriae* (more than 10 mg./ml.), while the effective concentration of N-sorboyl-glutamic acid is 1 mg./ml. and that of N-sorboyl-asparagin 1.25 mg./ml. The minimum concentration of N-sorboyl-glycine to prevent the growth of *Streptococcus hemolyticus* nearly amounts to 2.5 mg./ml.; N-sorboyl-glycine is thus five times as active as sorbic acid. With a minimum effective concentration of 1 mg./ml., N-sorboyl-sarcosine is ten times more active with respect to *Proteus vulgaris* than sorbic acid. N-sorboyl-valine was found to be active with respect to *Pseudomonoas aeruginosa* in a concentration of 1.5 mg./ml., sorbic acid only in a concentration of 8 mg./ml. With respect to *Escherichia coli*, N-sorboyl-isoleucine is active in a concentration of 2 mg./ml., that is to say it is three times as active than sorbic acid. This behavior is characteristic of the N-sorboylamino-carboxylic acids.

Neither the N-sorboylamino-carboxylic acids as such nor the cleavage products thereof (sorbic acid and aminocarboxylic acid), which may be formed in the body, are noxious to the body so that the utilization of these substances is entirely unobjectionable for the preservation of foodstuffs.

The permission to use the N-sorboylamino-carboxylic acids or the salts thereof according to the invention depends on the laws on foodstuffs in the different countries.

The following examples serve to illustrate the invention, but they are not intended to limit it thereto, the percentages being by weight:

*Example 1*

0.1% of N-sorboyl-glutamic acid was added to a mayonnaise having a low fat content, and the whole was stored at room temperature. The sample was still edible after a storage time of about 3 weeks while a distinct lactic fermentation was observed after a period of 10 days already in an identical sample that had not been preserved.

*Example 2*

Meat in mayonnaise ("Fleischsalat") that had been preserved with 0.1% of sorbic acid, exhibited a distinct lactic fermentation after 10 days storage in the breeding apparatus at 35° C. A similar sample which contained an addition of 0.15% of N-sorboyl-alanine was still edible after the same period.

*Example 3*

A commercial fish marinade ("Fischsalat") was preserved by means of the mayonnaise portion containing 0.05% or sorbic acid and benzoic acid, respectively, as well as 0.2% of the potassium salt of N-sorboyl-valine. After having been stored at room temperature for 3 weeks, the marinade was still in perfect condition while a similar marinade that had not been preserved exhibited distinct signs of decay after 4 days already.

*Example 4*

Protein glue was preserved with 0.25% of a mixture composed of equal parts of N-sorboyl-glutamic acid and N-sorboyl-sarcosine. The durability was 5 times as high as that of an unpreserved sample.

*Example 5*

Meat in mayonnaise ("Fleischsalat") that had been preserved by means of 0.1% of sorbic acid, exhibited a distinct lactic fermentation after about 10 days storage in the breeding apparatus at 35° C. A similar sample containing additionally 0.15% of N-sorboyl-glycine was still edible after having been stored for the same period.

We claim:
1. An N-sorboylamino compound of glutamic acid, hydroxyglutamic acid, glutamine, α-alanine, β-alanine, α-aminobutyric acid, asparagin, aspartic acid, cystine, dihydroxyphenyl-alanine, glycine, isoleucine, leucine, lysine, methionine, norleucine, ornithine, hydroxyproline, proline, serine, tryptophan, tyrosine, valine or sarcosine, or the salt thereof with an alkali metal or alkaline earth metal.

2. N-sorboyl-glycine of the formula

3. N-sorboyl-sarcosine of the formula

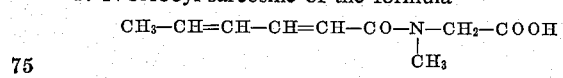

4. N-sorboyl-glutamic acid of the formula $$CH_3-CH=CH-CH=CH-CO-NH-\underset{\underset{CH_2-CH_2-COOH}{|}}{CH}-COOH$$

5. Mono-potassium salt of N-sorboyl-glutamic acid of the formula $$CH_3-CH=CH-CH=CH-CO-NH-\underset{\underset{CH_2-CH_2-COOH}{|}}{CH}-COOK$$

6. N-sorboyl-asparagin of the formula $$CH_3-CH=CH-CH=CH-CO-NH-\underset{\underset{CH_2-CO-NH_2}{|}}{CH}-COOH$$

References Cited by the Examiner

UNITED STATES PATENTS

| | | | |
|---|---|---|---|
| 2,866,818 | 12/1958 | Montagna | 260—526 |
| 2,959,614 | 11/1960 | McCord | 260—534 |
| 3,013,885 | 12/1961 | Van Overbeek | 99—154 |
| 3,112,341 | 11/1963 | Tatsuoka et al. | 260—534 |
| 3,126,287 | 3/1964 | Finkle | 99—154 |

LORRAINE A. WEINBERGER, *Primary Examiner.*

HYMAN LORD, *Examiner.*

A. P. HALLUIN, *Assistant Examiner.*